(12) United States Patent
Griffith (10) Patent No.: US 9,400,384 B2
(45) Date of Patent: Jul. 26, 2016

(54) DISPLAY ASSEMBLY, IN PARTICULAR A HEAD MOUNTED DISPLAY

(75) Inventor: Michael Stewart Griffith, Chelmsford (GB)

(73) Assignee: BAE SYSTEMS plc, London (GB)

(*) Notice: Subject to any disclaimer, the term of this patent is extended or adjusted under 35 U.S.C. 154(b) by 234 days.

(21) Appl. No.: 13/881,076

(22) PCT Filed: Oct. 24, 2011

(86) PCT No.: PCT/EP2011/068572
§ 371 (c)(1),
(2), (4) Date: Apr. 23, 2013

(87) PCT Pub. No.: WO2012/055824
PCT Pub. Date: May 3, 2012

(65) Prior Publication Data
US 2013/0234935 A1    Sep. 12, 2013

(30) Foreign Application Priority Data

Oct. 26, 2010   (EP) ..................................... 10275110
Oct. 26, 2010   (EP) ..................................... 10275111
Oct. 26, 2010   (GB) ................................... 1018045.3
Oct. 26, 2010   (GB) ................................... 1018067.7

(51) Int. Cl.
*G02B 27/00*   (2006.01)
*G02B 27/01*   (2006.01)
(Continued)

(52) U.S. Cl.
CPC .......... *G02B 27/0093* (2013.01); *G02B 26/004* (2013.01); *G02B 27/017* (2013.01); *G02B 3/0006* (2013.01); *G02B 2027/0187* (2013.01)

(58) Field of Classification Search
CPC ... G06F 3/013; G02B 27/0093; G02B 27/017
USPC ........................................................ 345/156
See application file for complete search history.

(56) References Cited

U.S. PATENT DOCUMENTS 3,942,270 A *   3/1976   Hoyt et al. ..................... 434/59
5,379,140 A     1/1995   Michel et al.
(Continued)

FOREIGN PATENT DOCUMENTS

EP       2 061 261 A1      5/2009
WO       WO 97/35223 A1    9/1997
(Continued)

OTHER PUBLICATIONS

International Preliminary Report on Patentability and Written Opinion dated May 10, 2013 from PCT/EP2011/068572.
(Continued)

*Primary Examiner* — Claire X Pappas
*Assistant Examiner* — Robert Stone
(74) *Attorney, Agent, or Firm* — Scully, Scott, Murphy & Presser, PC (57) ABSTRACT

A display assembly, comprising: a display device (30); a microlens array (34); and an eye tracker (8), for example a pupil tracker (8), and/or a head tracker; wherein plural pixels (150) or sub-pixels of the display device (30) are provided for each microlens (160) of the microlens array (34). The display may be adapted such that only certain pixels/sub-pixels (150) are activated/selected for any particular determined pupil/eye/head position, for example such that for each microlens (160), only one respective pixel/sub-pixel (150) is activated/selected for any particular determined pupil/eye/head position. The display device (30) may be a transparent display device (30), the microlens array (34) may be a switchable microlens array (34), and the display assembly may further comprise a light blocking device (32) that is switchable between a substantially light blocking state and a substantially light passing state.

14 Claims, 7 Drawing Sheets

(51) Int. Cl.
*G02B 26/00* (2006.01)
*G02B 3/00* (2006.01)

(56) References Cited

U.S. PATENT DOCUMENTS

| | | | | | |
|---|---|---|---|---|---|
| 5,572,343 | A | * | 11/1996 | Okamura et al. | 349/74 |
| 5,577,495 | A | * | 11/1996 | Murphy | 128/201.24 |
| 6,163,281 | A | * | 12/2000 | Torch | 341/21 |
| 7,408,601 | B1 | | 8/2008 | Huang et al. | |
| 2004/0108971 | A1 | * | 6/2004 | Waldern | G02B 27/0093 345/8 |
| 2005/0185051 | A1 | | 8/2005 | Perlin | |
| 2007/0091037 | A1 | * | 4/2007 | Lee | G02B 26/0875 345/84 |
| 2007/0097277 | A1 | | 5/2007 | Hong et al. | |
| 2007/0183020 | A1 | | 8/2007 | Hikmet | |
| 2007/0200927 | A1 | | 8/2007 | Krenik | |
| 2007/0273611 | A1 | * | 11/2007 | Torch | A61B 3/0066 345/8 |
| 2010/0027083 | A1 | * | 2/2010 | Kroll | G03H 1/02 359/9 |
| 2010/0103485 | A1 | * | 4/2010 | Haussler | G03H 1/02 359/9 |
| 2010/0271587 | A1 | * | 10/2010 | Pavlopoulos | G02B 27/0172 351/158 |
| 2011/0106339 | A1 | * | 5/2011 | Phillips et al. | 701/2 |
| 2011/0199202 | A1 | * | 8/2011 | De Mers et al. | 340/439 |
| 2011/0211190 | A1 | * | 9/2011 | Griffith et al. | 356/121 |

FOREIGN PATENT DOCUMENTS

| | | | | |
|---|---|---|---|---|
| WO | WO 01/16640 | A2 | 3/2001 | |
| WO | WO 2007/050311 | A2 | 5/2007 | |
| WO | WO2010058193 | * | 5/2010 | G01J 1/42 |

OTHER PUBLICATIONS

International Search Report dated Dec. 12, 2011 issued in PCT/EP2011/068572.
Extended European Search Report dated Mar. 25, 2011 issued in EP 10275111.2.
Extended European Search Report dated Mar. 21, 2011 issued in EP 10275110.4.
UK Search Report dated Feb. 11, 2011 issued in GB1018067.7.
Tung, Yeh-Jiun et al., "49.3: A 200-dpi Transparent a-Si TFT Active-Matrix Phosphorescent OLED Display", SID 05 Digest (2005), pp. 1546-1549.
Goodwin et al., "Artificial eyelid dynamic aperture optical arrays for large scale coding elements with application in visible to MWIR", Proc. of SPIE (2008), vol. 7096, pp. 70960E-1 to 70960E-10.
Langley, Derrick et al., "Fabrication Studies for Scaling Photonic MEMS Micro-shutter Designs", Proc. of SPIE (2008), vol. 7096, pp. 70960G-1 to 70960G-8.
Commander, L.G. et al., "Microlenses immersed in nematic liquid crystal with electrically controllable focal length", Third European Optical Society 'Microlens Arrays' Topical Meeting, 1995.
Kowalsky, W. et al., "See-through OLED displays", Proc. of SPIE (2008), vol. 6486, pp. 64860E-1 to 64860E-14.
Zhang, Wenfeng et al., "Single zinc-doped indium oxide nanowire as driving transistor for organic light-emitting diode", Applied Physics Letters 92 (2008), pp. 153312-1 to 153312-2.
Chronis, Nikolas et al., "Tunable liquid-filled microlens array integrated with microfluidic network", Optics Express (2003) vol. 11, No. 19, pp. 2370-2378.
Ju, Sanghyun et al., "Transparent Active Matrix Organic Light-Emitting Diode Displays Driven by Nanowire Transistor Circuitry", Nano Letters (2008), vol. 8, No. 4, pp. 997-1004.
Gu, G. et al., "Transparent organic light emitting devices", Applied Physics Letters (May 6, 1996), vol. 68, No. 19, pp. 2606-2608.

* cited by examiner

Fig. 3A (off mode)

Fig. 3B (on mode)

Fig. 3C

Fig. 4 (on mode)

DISPLAY ASSEMBLY, IN PARTICULAR A HEAD MOUNTED DISPLAY

FIELD OF THE INVENTION

The present invention relates to displays. The present invention relates in particular to, but is not limited to, head-up displays, for example head-up displays in aviation helmets.

BACKGROUND

Many head mounted displays offer a fully immersive visual environment, which may be termed virtual reality display, i.e. the user does not observe any outside scene and instead only observes images provided by the display. Providing displays in helmets, e.g. head-up displays in aviation helmets, is also known. These displays typically provide a display imaged at infinity superimposed onto the outside world image. Conventional examples of these displays have performance limitations that arise from a trade-off between providing as wide a field of view as possible with the increase in the weight of the projection system required for increasing width of field of view. In relation to certain helmets, e.g. helmets for soldiers, it has been proposed to provide transparent displays on visors of the helmets. Generally, transparent displays may be considered as displays which have some degree of transparency, i.e. that are not fully opaque. One recently developed example of transparent display is transparent organic light emitting diodes (OLED) type display, which may also be referred to as active matrix transparent organic light emitting diodes (AM-TOLED) type display.

Quite separate from use of transparent displays, pupil tracking is known in the use of helmets that provide a fully immersive visual environment. Pupil tracking apparatus tracks the positions of the user's pupils and the information of the pupils' positions is used accordingly.

Quite separate from the fields of displays in helmets and transparent displays, switchable microlens arrays are known. See for example "Microlenses immersed in nematic liquid crystal with electrically controllable focal length" L. G. Commander, S. E. Day, C. H. Chia, and D. R. Selviah, in Third European Optical Society 'Microlens Arrays' Topical Meeting, 1995, US20070183020 and U.S. Pat. No. 7,408,601B1.

SUMMARY OF THE INVENTION

A first aspect of the present invention provides a display assembly, comprising: a display device; a microlens array; and an eye tracker and/or a head tracker; wherein plural pixels or sub-pixels of the display device are provided for each microlens of the microlens array.

The eye tracker may comprise a pupil tracker.

The display assembly may be adapted such that only certain pixels/sub-pixels are activated/selected for any particular determined pupil/eye/head position.

The display assembly may be adapted such that for each microlens, only one respective pixel/sub-pixel is activated/selected for any particular determined pupil/eye/head position.

The display assembly may have a spherical shape.

The display device may be a transparent display device, the microlens array may be a switchable microlens array, and the display assembly may further comprise a light blocking device that is switchable between a substantially light blocking state and a substantially light passing state.

The transparent display device may be positioned between the light blocking device and the switchable microlens array. The transparent display device comprises an organic light emitting diodes display.

In a further aspect, the present invention provides a visor for a helmet, the visor comprising a display assembly according to any of the above aspects.

The light blocking device and the transparent device may be positioned one side of the main body of the visor, and the switchable microlens array may be positioned on the other side of the main body of the visor.

Where the microlens array is a switchable microlens array, the transparent display device and the switchable microlens array may be separated by a spacing that is provided by virtue of being the thickness, substantially, of the main body of the visor.

Where the microlens array is a switchable microlens array, the switchable microlens array may comprise a fluidic microlens array or a fluidic-filled microlens array, and wherein the visor acts as a substrate of the fluid/fluidic-filled microlens array.

In a further aspect, the present invention provides a helmet comprising a visor according to the above aspect.

The helmet may be an avionic helmet.

In a further aspect, the present invention provides a method of operating a display assembly; the method comprising providing a display assembly comprising a display device, a microlens array and an eye tracker and/or a head tracker, wherein plural pixels or sub-pixels of the display device are provided for each microlens of the microlens array.

The eye tracker may comprise a pupil tracker.

The method may further comprise: tracking and determining a pupil/eye/head position; and only activating/selecting certain pixels/sub-pixels for any particular determined pupil/eye/head position.

The pixel/sub-pixel activating/selecting may be performed such that for each microlens, only one respective pixel/sub-pixel is activated/selected for any particular determined pupil/eye/head position.

The method of operating a display assembly provided with a light blocking device and a switchable microlens array, may comprise:

operating the display assembly in a time-multiplexed manner between an off mode and an on mode; wherein in the off mode external images are allowed to be viewed through the display assembly by virtue of at least some transparency of the display device (30), by virtue of switching the light blocking device (32) to a substantially light passing state, and by virtue of switching the switchable microlens array (34) to a substantially optically flat mode; in the on mode external images are substantially blocked by virtue of switching the light blocking device (32) to a substantially light blocking state; and further, in the on mode, display images are provided by virtue of switching the display device (30) to an image-providing mode, and by virtue of switching the switchable microlens array (34) to an optically active light directing mode.

DETAILED DESCRIPTION

Figure 1:
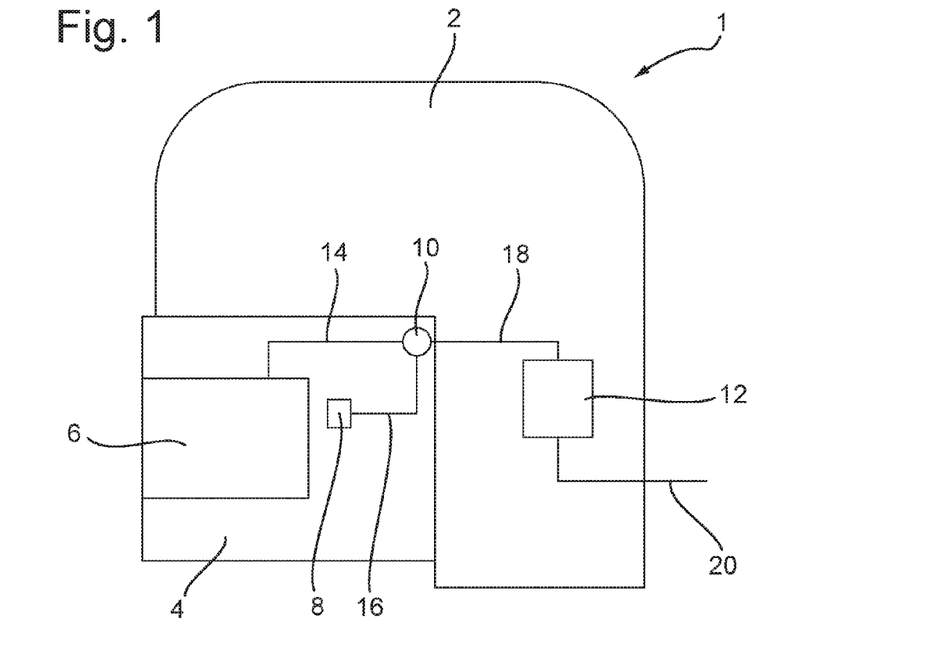
FIG. 1 is a schematic illustration of a helmet assembly.

FIG. 1 is a schematic illustration of a first embodiment of a helmet assembly 1.

The helmet assembly 1 comprises a helmet body 2, a visor 4, a transparent display assembly 6, a pupil tracker 8, a connector 10, and a controller 12. The transparent display assembly 6 is electrically connected to the connector 10 by a link, hereinafter referred to as the display link 14. The pupil tracker 8 is electrically connected to the connector 10 by a further link, hereinafter referred to as the pupil tracker link. The connector 10 is electrically connected to the controller 12 by a further link, hereinafter referred to as the controller link 18. The controller 12 is electrically connected to electronics (not shown) external to the helmet assembly 1 by a further link, hereinafter referred to as the external link 20.

In this embodiment the helmet assembly 1 is an aviation helmet assembly. The helmet body 2 is a conventional helmet body of an aviation helmet except where described otherwise below. The visor 4 is a conventional visor for an aviation helmet except where described otherwise below.

The visor 4 is physically connected to the helmet body 2 at the connector 10. In this embodiment the connector 10 is hinged such that the visor 4 may be moved out of the line of sight of the user. In this embodiment, various electrical connections are made via the connector 10, as will be described in more detail below. A further hinge arrangement (not shown) is provided on the other side of the helmet assembly, but in this embodiment that further hinge arrangement does not also provide electrical connections.

The transparent display assembly 6 is integrated with the visor 4 in a manner that will be described in more detail below with reference to FIG. 2. It is noted that the transparent display assembly 6 in itself represents an embodiment of the present invention.

The pupil tracker 8 is a conventional pupil tracker. The pupil tracker 8 is attached to the inside of the visor 4, at a location adjacent to the display assembly 6.

The external link 20 comprises low voltage differential signalling (LVDS) cable. In other embodiments, any other appropriate form of external link may be employed, for example a 60 GHz wireless communications link.

As will be described in more detail later below, in operation, the transparent display assembly is operated in a time-multiplexed manner between an "off" mode and an "on" mode. In the "off" mode, due to the transparency of the transparent display assembly 6, real external images are viewable through the visor 4 by the user. In the "on" mode, images displayed by the transparent display assembly 6 are viewable by the user, and external light is blocked by the transparent display assembly 6.

The controller 12 comprises a receiver for receiving, via the external link and in the form of incoming serial information, the images to be displayed by the transparent display assembly 6. The controller 12 further comprises display drivers for driving the transparent display assembly 6. The controller 12 decodes the incoming serial information to provide drive data for the drivers. The drive data is forwarded to the transparent display assembly 6 via the controller link 18 and the display assembly link 14. The drive data drives the transparent display assembly 6 such as to allow external real images to be viewed in the "off" mode, and to display the appropriate images and block outside light in the "on" mode.

The pupil tracker 8 tracks the position of the pupils of the eyes of the user. Information relating to the determined positions is provided to the controller 12 via the pupil link 16 and the controller link 18. The controller 12 uses this information when determining the required drive data for the received image information to be displayed, i.e. the controller adapts the received image data to accommodate the pupil tracking information when determining the drive data. The controller also determines feedback information for the pupil tracker which it feeds back to the pupil tracker via the controller link 18 and the pupil tracker link 16.

Apparatus, including the controller (and where appropriate) pupil tracker, for implementing the above arrangement, and performing the method steps to be described later below, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

Figure 2:
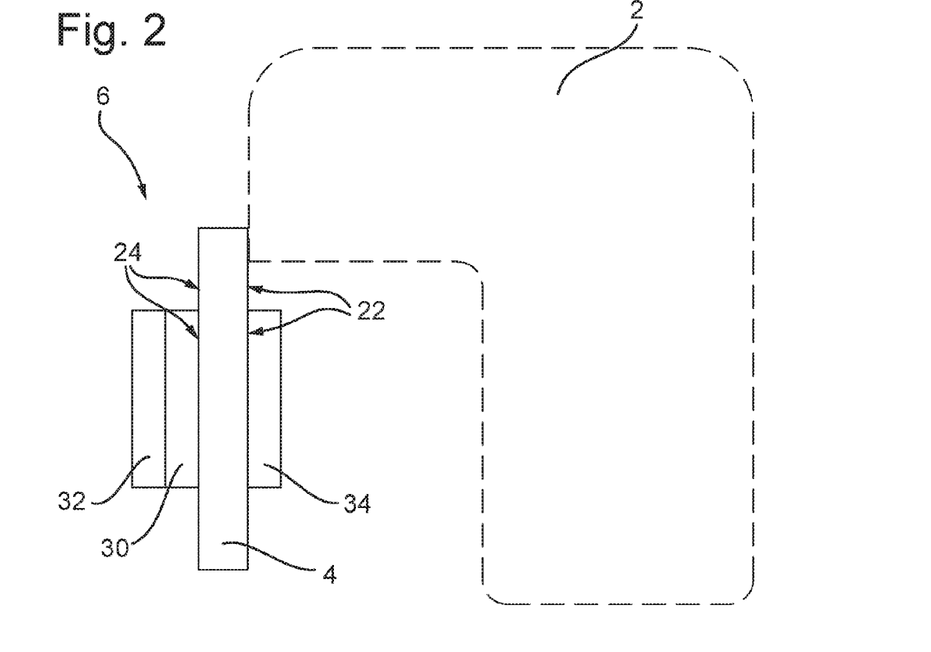
FIG. 2 is a schematic illustration showing further details of a transparent display assembly, of the helmet assembly of FIG. 1, viewed in cross-section.

FIG. 2 is a schematic illustration showing further details of the transparent display assembly 6 viewed in cross-section. The visor 4 comprises an inside surface 22 and an outside surface 24, the terms "inside" and "outside" relating respectively to the interior volume of the helmet provided by virtue of the visor's attachment to the helmet body 2 (shown in dotted line form in FIG. 2 for positional reference). The transparent display assembly 6 comprises a portion (i.e. area as indicated in FIG. 1) of the visor 4 with the following elements positioned thereon: a transparent display device 30 on the outside surface 24 of the visor 4, a light blocking device 32 on the transparent display device 30, and a switchable microlens array 34 on the inside surface 22 of the visor 4. Thus the transparent display device 30 and the switchable microlens array 34 are separated by the thickness of the visor 4, which in this embodiment is approximately 3 mm. In FIG. 2 for clarity the surfaces of the various elements are shown as straight lines, although the elements may be curved.

In this embodiment the transparent display device 30 is an organic light emitting diodes (OLED) type display. In this embodiment the light blocking device 32 is a liquid crystal device. Further details of these, and of the switchable microlens array 34, will be described later below. In this embodiment the transparent display device 30, the light blocking device 32, and the switchable microlens array 34 are protectively sealed relative to the surfaces of the visor 4 by encapsulation layers (not shown).

Figure 3A:
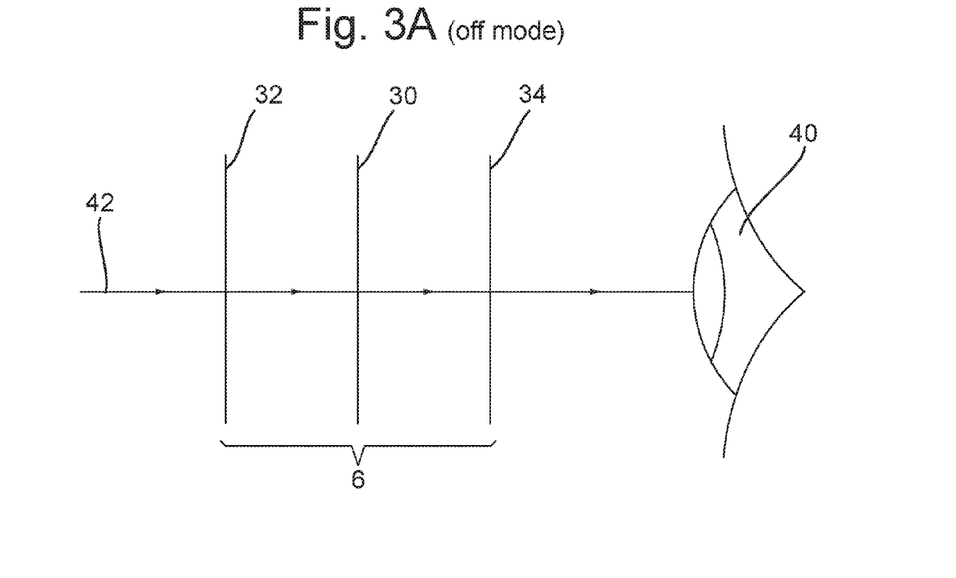
FIG. 3A shows the transparent display assembly of FIG. 2 operating in its off mode.
Figure 3B:
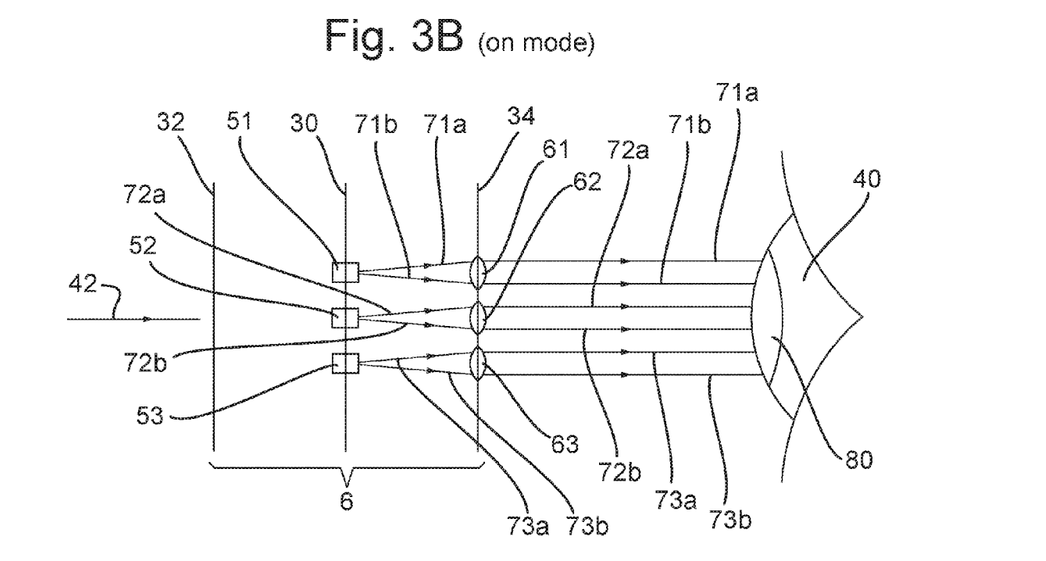
FIG. 3B shows the transparent display assembly of FIG. 2 operating in its on mode.

FIGS. 3A and 3B are schematic illustrations showing certain functional aspects of the components of the transparent display assembly 6 relative to a user's eye 40. In FIGS. 3A and 3B, the transparent display device 30, the light blocking device 32, and the switchable microlens array 34 are shown schematically in line form for the sake of clarity. Also for clarity the lines representing the various elements are shown as straight lines, although the elements may be curved. In operation, Thus, as schematically indicated in FIGS. 3A and 3B, the light blocking device 32, the transparent display device 30 and the switchable microlens array 34 act as optical elements in series (in the order given) and in series with the user's eye 40.

FIG. 3A shows the transparent display assembly 6 operating in its off mode.

In the off mode, the light blocking device 32 is controlled or switched to allow external light 42 to pass through.

The external light 42 then passes through the transparent display device 30 due to the transparent nature of the transparent display device 30. In the off mode the transparent display device 30 is controlled or switched such that its pixels (described later below) have substantially no effect on the light passing through. The amount or brightness level of the external light 42 that passes though the transparent display device 30 depends on the relative transparency/opaqueness of the transparent display device 30, however the image content (i.e. of the outside scene) remains substantially unaltered.

The external light then passes through the switchable microlens array 34. In the off mode the switchable microlens 34 is controlled or switched to an off mode, i.e. a mode in which there is substantially no microlens activity, i.e. the switchable microlens array 34 is substantially optically flat.

The external light then reaches the user's eye 40. The image content of the external light 42 is substantially retained during the passage of the light through the various elements, i.e. the user is afforded a natural view of the outside world. It is further noted that the external light 42 remains substantially unfocussed i.e. the external light 42 reaches the user's eye 40 in a substantially parallel fashion substantially unaltered by passing through the transparent display assembly (in its off mode), such that the user perceives outside view as being at (optical) infinity as he would were he viewing the outside view directly i.e. not through the transparent display assembly 6.

FIG. 3B shows the transparent display assembly 6 operating in its on mode.

In the on mode, the light blocking device 32 is controlled or switched to block the arriving external light 42, which therefore does not pass though the transparent display assembly 6, and which therefore does not reach the user's eye 40. In practice, 100% of the light cannot fully be blocked, i.e. in practice the light is substantially fully blocked, i.e. substantially fully attenuated, i.e. fully attenuated in a practical sense, even if not literally absolutely fully blocked.

FIG. 3B further shows schematically, by way of example, three of the pixels of the transparent display device 30, namely a first pixel 51, a second pixel 52 and a third pixel 53. In practice there will be many more than three pixels. The switchable microlens array 34, when switched to be optically active (as described in more detail below), comprises a plurality of microlenses arranged in an array. In this embodiment the microlenses are individual circular lenses arranged in a two-dimensional array (as opposed, for example, to an array of lenticular lenses which may be employed in other embodiments). In FIG. 3B, for convenience, only one respective individual microlens is shown positioned to act for a respective individual pixel. In FIG. 3B, by way of example, three such microlenses are shown schematically, namely a first microlens 61, a second microlens 62 and a third microlens 63. The first microlens 61 is positioned in front of the first pixel 51 so as to redirect light emitted from the first pixel 51, the second microlens 62 is positioned in front of the second pixel 52 so as to redirect light emitted from the second pixel 52, and the third microlens 63 is positioned in front of the third pixel 53 so as redirect light emitted from the third pixel 53. Also, due to the sideways view of FIG. 3B, only pixels of a single column of the row and column array of pixels, and correspondingly, only microlenses of a single column of the row and column array of microlenses/pixels are seen in FIG. 3B. It will be appreciated that the following description of FIG. 3B in effect describes a nominal one-dimensional operation, whereas in practice the corresponding behaviour is taking place across the area of the display in a two-dimensional sense.

In the on mode the transparent display device 30 is controlled or switched to display the image content defined by the drive data (the drive data being received from the controller 12 as described earlier above). The light emitted by the pixels 51, 52, 53 of the transparent display device 30 is emitted towards the switchable microlens array 34. By way of example, display image light rays from the pixels that nominally fall on the extreme points of the respective microlenses are shown schematically in FIG. 3B and will now be described. Of course, a continuous spread of light rays is in practice emitted by each pixel and directed by its corresponding microlens, but the following light rays serve to illustrate the overall operation. In the following, the terms "upper" and "lower" are used merely for ease of reference and relate to the schematic view of FIG. 3B.

The first pixel 51 emits an upper light ray 71a and a lower light ray 71b. The upper light ray 71a falls on the upper extreme of the first microlens 61. The lower light ray 71b falls on the lower extreme of the first microlens 61.

The second pixel 52 emits an upper light ray 72a and a lower light ray 72b. The upper light ray 72a falls on the upper extreme of the second microlens 62. The lower light ray 72b falls on the lower extreme of the second microlens 62.

The third pixel 53 emits an upper light ray 73a and a lower light ray 73b. The upper light ray 73a falls on the upper extreme of the third microlens 63. The lower light ray 73b falls on the lower extreme of the third microlens 62.

In the on mode the switchable microlens array 34 is controlled or switched to a mode in which the microlenses are effective, i.e. the switchable microlens array 34 acts substantially optically as a microlens array.

Figure 3C:
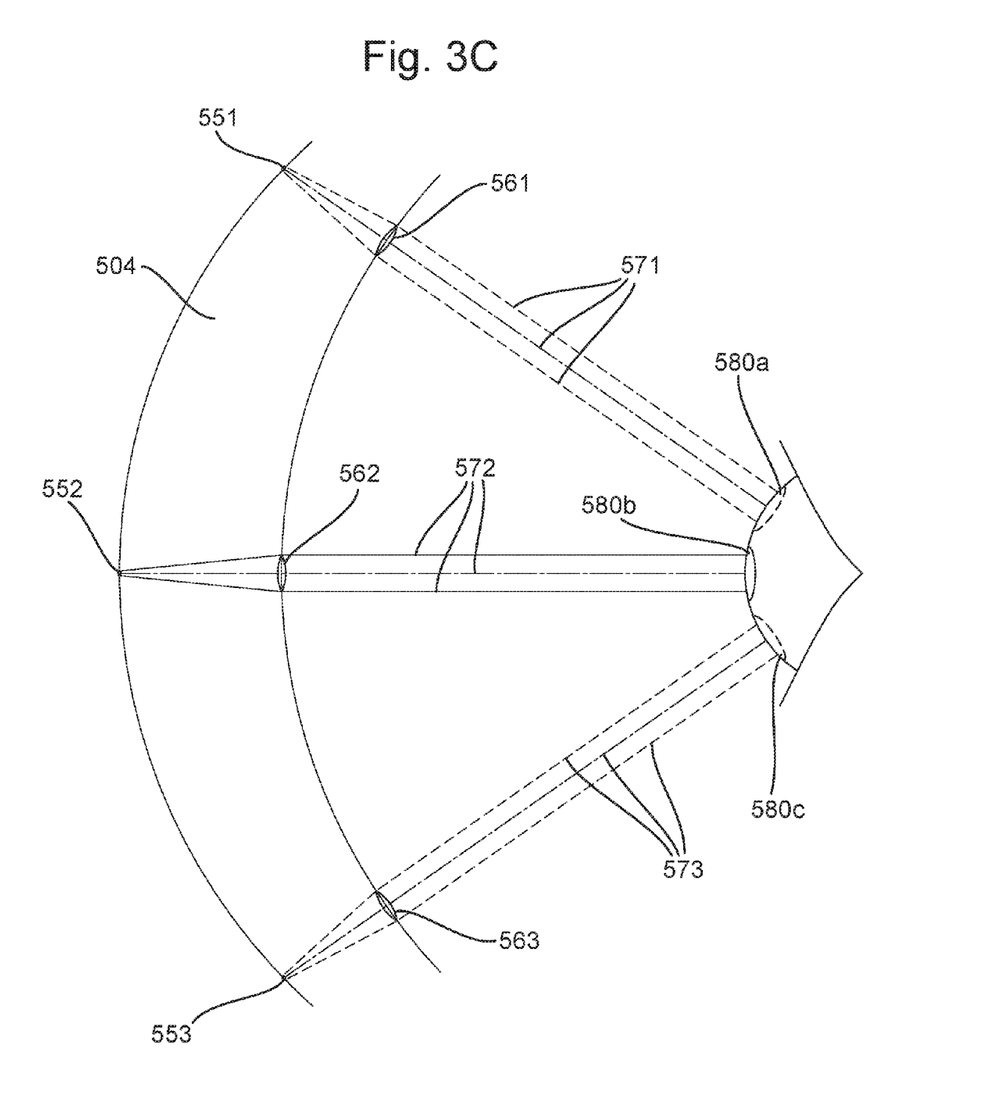
FIG. 3C shows schematically (not to scale) certain details of an example in which the transparent display assembly of FIG. 2 has a spherical shape.

In the on mode, the microlenses 61, 62, 63 operate to direct the light rays emitted by the pixels 51, 52, 53 toward the user's eye 40, in particular the pupil 80 of the user's eye 40, in a substantially parallel fashion, such that the user perceives the image being displayed by the pixels 51, 52, 53 of the transparent display device 30 as being at infinity. In a preferred embodiment that tends to provide a high degree of orientation between the pixel and the microlens in the respective pixel/microlens pairs, the visor, i.e. the transparent display assembly 6, has a spherical shape such that, as the pupil moves in an arc, the parallel rays emitted from the visor will always or usually be normal to the pupil as it moves. FIG. 3C shows schematically (not to scale) certain details of such an embodiment in which example pixels 551, 552, 553 and their paired respective example microlenses 561, 562, 563 are provided on a visor 504 such that the example parallel rays 571, 572, 573 are normal to example pupil positions. Other embodiments that, with planar or other (i.e. non-spherical) shapes of visor nevertheless tend to provide improved extent of normal direction of the light rays at the pupil will be described later below.

In terms of the light rays shown in FIG. 3B, all of the light rays, i.e. the upper and lower light rays 71a, 71b from the first pixel 51, the upper and lower light rays 72a, 72b from the second pixel, and the upper and lower light rays 73a, 73b from the third pixel 53, are directed by the respective microlenses 61, 62, 63 toward the pupil 80 of the user's eye 40 in a substantially parallel fashion to provide that the display image viewed by the user is viewed as an image displayed at (optical) infinity. In practice, since the display area is larger than the area of the pupil 80 of the user's eye 40, geometry dictates that the light rays 71a, 71b, 72a, 72b, 73a, 73b cannot literally be parallel, however they are parallel in the optical sense of not crossing thereby not providing a focus point that is perceived substantially closer to the user than e.g. the outside view provided by the external light 42 in the on mode of the transparent display assembly 6.

Thus in this embodiment, both the outside view provided to the user when the transparent display assembly 6 is switched to its off mode, and the image displayed by the transparent display device 30 when the transparent display assembly 6 is switched to its on mode, are perceived to be at (optical) infinity. This allows the transparent display assembly 6 to be operated to provide a so-called "augmented reality" mode of operation. In this augmented reality mode of operation, the controller 12 switches sequentially and repeatedly between the on mode and the off mode. This is performed at a switching rate that leaves both the outside view and display image retained by the user's viewing perception, i.e. as commonly described the switching between the outside view and the displayed image is "too fast for the eye to notice". This provides the user with an overall perceived view of the image displayed by the transparent display device 30 superimposed on the outside view. Preferably, the switching between the on and off mode is carried out at a rate ≥66 Hz, even more preferably at a rate ≥100 Hz (i.e. 10 msec frame time). However, if required, either the on mode or off mode may be employed for a significantly longer period of time such that the user perceives only the displayed image or only the outside view for the length of time the respective mode is switched to. In this case, whilst switched to the on mode, the transparent display assembly 6 is providing a fully immersive display mode of operation. Also, more generally, the provision of "augmented reality" is not essential, and accordingly in other embodiments only a virtual reality display assembly ("fully immersive") is provided, i.e. there is no "off mode" in the sense described above. In such embodiments, the display device does not need to be transparent, the light blocking device does not need to be included, and the microlens arrays does not need to be switchable.

In a further preferred embodiment, which in this case does not make use of a spherical shaped visor, the controller 12 is used to adapt the drive data, based on pupil tracking information provided to the controller 12 by the pupil tracker 8, such that the image light emitted by transparent display device 30 falls as required on the pupil 80 of the user's eye 40. This is particularly advantageous in this augmented reality embodiment (since the user is particularly likely to move their eyes due to looking at the outside view), nevertheless this may also be done in other embodiments, for example in fully immersive embodiments such as discussed above in the preceding paragraph.

One way this can be done is that individual image points can be effectively shifted on the transparent display device i.e. individual image points "moved" to adjacent/different pixels, as required, to provide that the pixel output is directed towards the pupil. Other ways of varying the drive data to respond to the information provided by pupil tracker 8, that make use of more than one pixel or more than one sub-pixel being provided for each respective microlens, will be described later below.

A further embodiment of a helmet assembly 1 including a further embodiment of a transparent display assembly 6 will now be described with reference to FIG. 4. In this further embodiment, the helmet assembly 1 and the constituent components thereof, are the same as described above with reference to FIGS. 1 to 3, and indicated by the same reference numerals, and their operation is the same as described above with reference to FIGS. 1 to 3, except where described otherwise below.

In this further embodiment, the operation of the transparent display assembly 6 is the same as for the earlier embodiment, in particular as described for the off mode above with reference to FIG. 3A. However, in this further embodiment, the operation in the on mode is different to that described above with reference to FIG. 3B, in overview the difference being that in this further embodiment the light rays constituting the image emitted by the transparent display device 30, e.g. such as the light rays 71a, 71b, 72a, 72b, 73a, 73b, are redirected by the respective microlenses such as to be focussed, either fully or at least to an extent, at a point closer than (optical) infinity, as perceived by the user's eye 40, as will now be described in more detail with reference to FIG. 4.

Figure 4:
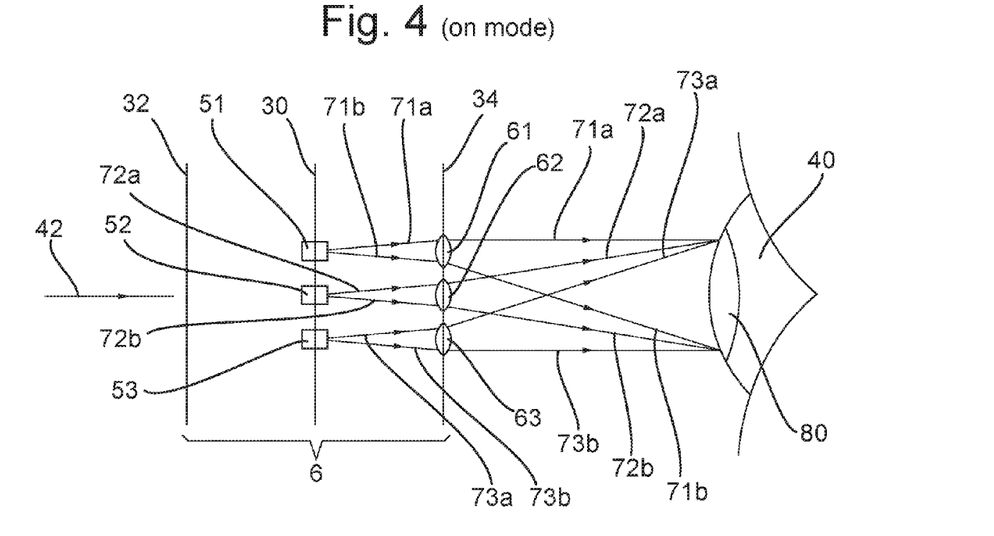
FIG. 4 is a schematic illustration (not to scale) showing, operating in its on mode, a further example of a transparent display assembly.

FIG. 4 is a schematic illustration (not to scale) showing the transparent display assembly 6 of this further embodiment operating in its on mode.

As was the case for FIG. 3B, It will be appreciated that the following description of FIG. 4 in effect describes a nominal one-dimensional operation, whereas in practice the corresponding behaviour is taking place across the area of the display in a two-dimensional sense. Also, as was the case for FIG. 3B, for convenience, only one respective individual microlens is shown positioned to act for a respective individual pixel.

In the on mode, the light blocking device 32 is controlled or switched to block the arriving external light 42, which therefore does not pass though the transparent display assembly 6, and which therefore does not reach the user's eye 40.

In the on mode the transparent display device 30 is controlled or switched to display the image content defined by the drive data (the drive data being received from the controller 12 as described earlier above). The light emitted by the pixels 51, 52, 53 of the transparent display device 30 is emitted towards the switchable microlens array 34. By way of example, display image light rays from the pixels that nominally fall on the extreme points of the respective microlenses are shown schematically in FIG. 4 and will now be described. Of course, a continuous spread of light rays is in practice emitted by each pixel and directed by its corresponding microlens, but the following light rays serve to illustrate the overall operation. In the following, the terms "upper" and "lower" are used merely for ease of reference and relate to the schematic view of FIG. 4.

The first pixel 51 emits an upper light ray 71a and a lower light ray 71b. The upper light ray 71a falls on the upper extreme of the first microlens 61. The lower light ray 71b falls on the lower extreme of the first microlens 61.

The second pixel 52 emits an upper light ray 72a and a lower light ray 72b. The upper light ray 72a falls on the upper extreme of the second microlens 62. The lower light ray 72*b* falls on the lower extreme of the second microlens 62.

The third pixel 53 emits an upper light ray 73*a* and a lower light ray 73*b*. The upper light ray 73*a* falls on the upper extreme of the third microlens 63. The lower light ray 73*b* falls on the lower extreme of the third microlens 62.

In the on mode the switchable microlens array 34 is controlled or switched to a mode in which the microlenses are effective, i.e. the switchable microlens array 34 acts substantially optically as a microlens array.

In the on mode, the microlenses 61, 62, 63 operate to focus the light rays emitted by the pixels 51, 52, 53 so as to be perceived by the pupil 80 of the user's eye 40 as focussed or at least partially focussed at a point closer than (optical) infinity, such that the user sees a focussed form of the image being displayed by the pixels 51, 52, 53 of the transparent display device 30.

In terms of the light rays shown in FIG. 4, the upper light rays 71*a*, 72*a*, 73*a* emitted by each of the respective pixels 51, 52, 53 are directed by the respective microlenses 61, 62, 63 to the top of the pupil 80 of the user's eye 40, and the lower light rays 71*b*, 72*b*, 73*b* emitted by each of the respective pixels 51, 52, 53 are directed by the respective microlenses 61, 62, 63 to the bottom of the pupil 80 of the user's eye 40. This is an idealised account. In practice the focussing will not be as perfect as this. Nevertheless, it will be appreciated by the skilled person that such focussing will be provided, to at least some extent, compared to e.g. the unfocussed "parallel" arrangement provided by the first embodiment described earlier above with reference to FIG. 3A.

By implementing the focussing (or partial focussing) provided by this further embodiment, the advantage of the first embodiment of being able to impose a display image from infinity over an outside view from infinity (hence being particularly suited to augmented reality operation) is lost or diminished. Nevertheless, this further embodiment may be useful if design, cost, etc. limitations give a motive for providing this embodiment despite such performance limitations. Accordingly this further embodiment is particularly suited for operation as a fully immersive display.

However, if desired, this further embodiment can be employed in an augmented reality mode of operation, as described earlier above, but with the disadvantage that the user will have difficulties distinguishing between the two views (i.e. between the outside view and the displayed view), requiring the user to attempt to focus on one or the other as required. Thus would typically not be desirable, however might for example be implemented in certain circumstances, e.g. alarm situations. In such circumstances the displayed image may be restricted to a simple warning sign, perhaps of just one colour. Another possible refinement is that the image displayed may be specifically designed to appear as if coming from optical infinity, e.g. by "stretching" or "compressing" the form of the warning sign in the image.

In this further embodiment, the controller 12 adapts the drive data, based on pupil tracking information provided to the controller 12 by the pupil tracker 8, such that the image light emitted by transparent display device 30 falls as required on the pupil 80 of the user's eye 40.

In the embodiments described above, more pixels than microlenses are provided, for example in some embodiments each microlens has an array of four pixels associated with it (i.e. in a 2×2 array), or for example in further embodiments each microlens has an array of nine pixels associated with it (i.e. in a 3×3 array).

Further details of how plural pixels are provided for each microlens will now be described with reference to a further embodiment shown in FIG. 5. In this further embodiment, the helmet assembly 1 and the constituent components thereof, are the same as described above with reference to FIGS. 1, 2, and 3A-C, and indicated by the same reference numerals, and their operation is the same as described above with reference to FIGS. 1, 2, and 3A-C except where described otherwise below.

In this further embodiment, there are nine pixels, arranged in a three-by-three array, provided for each microlens. FIG. 5 is a schematic illustration (not to scale) that shows, for clarity, certain aspects of this arrangement in terms of just the sideways view of FIG. 5, and hence only three pixels of the nine pixels positionally associated with the each microlens are shown in this view. It will be appreciated that the following description of FIG. 5 will in effect describe a nominal one-dimensional operation, whereas in practice the corresponding behaviour is taking place across the area of the display in a two-dimensional sense.

Figure 5:
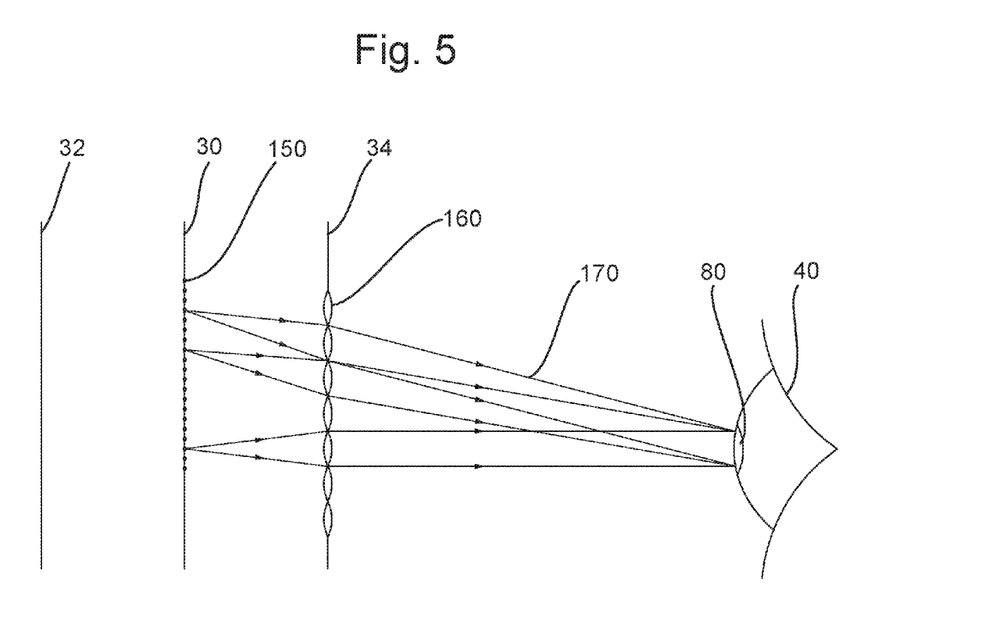
FIG. 5 is a schematic illustration (not to scale) that shows certain aspects of an arrangement in which plural pixels of a transparent display device of the transparent display assembly are provided for each microlens of a switchable microlens array of the transparent display assembly.

FIG. 5 shows the light blocking device 32, the transparent display device 30, the switchable microlens array 34, and the user's eye 40, in particular the pupil 80. The transparent display device 30 comprises a plurality of pixels 150 (of which, for clarity, only one is indicated by the reference numeral 150 in FIG. 5). An example set of such pixels is shown, in practice there will typically be many more extending above and below the ones shown in FIG. 5. The switchable microlens array 34 comprises a plurality of microlenses 160 (of which, for clarity, only one is indicated by the reference numeral 160 in FIG. 5). An example set of such microlenses is shown, in practice there will typically be many more extending above and below the ones shown in FIG. 5.

In the on mode, the light blocking device 32 is controlled or switched to substantially block the arriving external light 42, in the same manner as in the earlier embodiments above.

In the on mode the transparent display device 30 is controlled or switched to display the image content defined by the drive data (the drive data being received from the controller 12 as described earlier above). The light emitted by the pixels 160 of the transparent display device 30 is emitted towards the switchable microlens array 34. Only certain pixels are driven (i.e. activated/selected), as will be explained in more detail below. By way of example, certain display image light rays 170 from the certain pixels that are being driven in an example situation shown in FIG. 5 and that nominally fall on the extreme points of certain microlenses are shown schematically in FIG. 5 (for clarity, only one is indicated by the reference numeral 160 in FIG. 5). Of course, a continuous spread of light rays is in practice emitted by each pixel and directed by the microlenses, but the light rays shown in FIG. 5 serve to illustrate in particular certain details of the operation.

In the on mode the switchable microlens array 34 is controlled or switched to a mode in which the microlenses are effective, i.e. the switchable microlens array 34 acts substantially optically as a microlens array.

In the on mode, the microlenses 160 operate to direct the light rays emitted by the above mentioned certain pixels 150 toward the user's eye 40, in particular towards the pupil 80, in a substantially parallel fashion (limitations with regard to true parallelism are as described for the earlier embodiment above), such that the user perceives the image being displayed by the pixels 160 of the transparent display device 30 as being at infinity.

Moreover, as shown schematically in FIG. 5, for a given position of the pupil 80, only one pixel 150 is activated/selected for each lens i.e. pixel/microlens pairs are dynamically created in response to the drive data content and the pupil position information from the pupil tracker. The other pixels are not activated/selected. Correspondingly, for a pupil position different to that shown in FIG. 5, a different choice of pixels to be activated/selected would be determined.

Thus this further embodiment provides an arrangement in which different positions of the pupil 80 of the user's eye 40 can be accommodated.

It is further noted that depending on the connections between pixels and the driving schemes of the pixels (or even depending on the differing use of terminology), a corresponding arrangement may be provided, i.e. another version of this further embodiment is provided, when there is only one pixel per microlens, but that pixel comprises plural sub-pixels. In such a version given sub-pixels (e.g. only one) per microlens are activated/selected based upon determined pupil/eye/head position in corresponding fashion to how it is described above for the plural pixels per microlens versions that given pixels (e.g. only one) per microlens are activated/selected based upon determined pupil/eye/head position.

In a further embodiment, the transparent display device 30 and the switchable microlens array are arranged to provide a binocular display image when the transparent display assembly is operating in its on mode. This is readily achievable since the two eyes of the user are relatively widely spaced compared to a typical distance between the visor and the eyes. Also auto stereoscopic display operation may be provided.

In further embodiments, any of the above described embodiments may be modified by the inclusion of an intermediate lens between the microlens array and the user's eye.

Further details of the light blocking device 32, as used in augmented reality embodiments, will now be described.

As described above, in the above described augmented reality embodiments, the light blocking device 32 primarily operates to block the external light 42 when the transparent display assembly 6 is in its on mode, i.e. when the transparent display device 30 is displaying an image. Preferably the light blocking device 32 also operates to block light from inside the helmet assembly escaping to the outside world, in particular light emitted by the transparent display assembly 6. This may include during the off mode as well as during the on mode of the transparent display assembly 6, as the transparent display device 30 may have e.g. a backlight that remains illuminated and possibly leaks into the inside of the helmet, even when the transparent display assembly 6 is in its off mode.

Considering again the primary function of the light blocking device 32 of blocking the external light 42 when the transparent display assembly 6 is in its on mode, the light blocking device preferably has the following performance characteristics:

(i) allows ≥50% of the external light through when the transparent display assembly is in its off mode;

(ii) for augmented reality operation, has a switching time of ≤1 ms for each of switching to opaque and switching to transmissive states;

(iii) for augmented reality operation, has a contrast ratio between the amount of external light allowed through when the transparent display assembly is in its off mode and the amount of external light allowed through when the transparent display assembly is in its on mode of ≥100:1, and more preferably ≥1000:1.

In further embodiments, the light blocking device 32 can itself be pixellated i.e. addressable. This would allow a negative contrast display.

In the above described embodiments the light blocking device 32 is a liquid crystal shutter. In other embodiments any other suitable type of switchable light blocking layer may be used, for example an electrochromic shutter or a MEMS shutter (further details of these are also described below).

In this embodiment the liquid crystal shutter providing the light blocking device 32 is a twisted nematic polariser-based liquid crystal shutter, however in other embodiments other suitable types of liquid crystal shutter may be employed. The liquid crystal shutter advantageously has high contrast ratio, low light level transmission in the "dark" state, and operates at low voltage.

More details of electrochromic shutters, that may be used in other embodiments to provide the light blocking device 32, are as follows. Electrochromism is the phenomenon displayed by some chemical species of reversibly changing colour when a burst of electrical charge is applied. One example of an electrochromic material is polyaniline. Polyaniline can be formed either by the electrochemical or chemical oxidation of aniline. If an electrode is immersed in hydrochloric acid which contains a small concentration of aniline, then a film of polyaniline can be grown on the electrode. Other electrochromic materials include viologens, polyoxotungstates, and tungsten oxide ($WO_3$).

The transmission range of the electrochromic material can be altered in an analogue fashion by changing a voltage applied thereto, for example over a range of around 80% to 15% transmission. The electrochromic material is of solid state nature and can be deposited at low temperature directly to the relevant deposition surface (e.g. a transparent electrode layer applied to the outer surface of the transparent display device), and a further transparent electrode layer can then be deposited on the electrochromic layer.

The failure mode for electrochromic materials is the transparent state, hence they can provide a light blocking device that fails safe in terms of the user being able to see the outside view if the light blocking device fails.

More details of MEMS shutters, that may be used in other embodiments to provide the light blocking device 32, are as follows.

One type of MEMS shutter that may be employed is an array of so-called "artificial eyelids". The operation of such artificial eyelids is based on a pre-stressed, partially curled flexible film with one electrode in the film and a second electrode fixed to the relevant substrate, which here may for example be the outside surface of the transparent display device 30. When a voltage is applied between the electrodes, an electrostatic attraction is established, and the film unrolls against the substrate. Further details are given in the following references, which are incorporated herein by reference: Scott Goodwin et al., "Artificial eyelid dynamic aperture optical arrays for large scale coding elements with application in Visible MWIR", Proc. of SPIE Vol. 7096, 70960E-1, (2008); and Derrick Langley et al., "Fabrication Studies for Scaling Photonic MEMs Micro-Shutter Designs, Proc. of SPIE Vol. 7096, 70960G-7, (2008).

Further details of the transparent display device 30, as used in augmented reality embodiments, will now be described.

In the above augmented reality embodiments the transparent display device 30 is an organic light emitting diodes (OLED) type display, which may also be referred to as active matrix transparent organic light emitting diodes (AM-TOLED) type display.

OLEDs are emissive and therefore do not require a backlight. Flexible OLED displays may be made by depositing an OLED array onto a flexible substrate.

OLED pixels with more than 80% transmission in the optical region are described in the following reference, which is incorporated herein by reference: G. Gu et al., "Transparent organic light emitting devices", Applied Physics Letters 68, 2606-2608, 1996.

A transparent OLED display is preferably provided with an active matrix architecture to reduce power requirement and to allow larger displays to be made. In order to avoid the disadvantage of relative opacity of silicon-based backplanes, an amorphous silicon backplane may be used, such as, or based on, the OLED display (which achieved 23% transparency in the off state) on an amorphous silicon backplane described in the following reference, which is incorporated herein by reference: Yeh-Jiun et al., "A 200-dpi Transparent a-Si TFT Active-Matrix Phosphorescent OLED Display", SID Digest 2005, 1546.

However, backplanes based on silicon thin film transistors will tend to be limited in the extent of transparency achievable, hence another preferred approach would be to use more fundamentally transparent transistors/circuitry. These may be based on, for example, zinc oxide or amorphous oxide semiconductor (AOS) backplanes and nanowire transistors. These provide higher electron mobility which enables production of faster and smaller transistors and higher resolutions. For example, zinc-tin-oxide based transistors may be used, such as, or based on, ones described in the reference given at the end of this paragraph and which use aluminium doped zinc-oxide and indium-tin-oxide as the conducting transparent electrodes. A monolithically stacked transparent "smart pixel" OLED on top of a transistor has provided an average transparency of 70% in the visible part of the spectrum with a luminance of approximately 700 cd/m$^2$. The reference (which is incorporated herein by reference) mentioned above in this paragraph is as follows: Kowalsky, W. et al., "See-through OLED displays", Proc. of SPIE Vol. 6486 64860F-1 (2008).

Another possibility as an alternative to thin film transistors is transparent indium oxide nanowire transistors, for example, such as, or based on, ones described in the following references, which are incorporated herein by reference: Sanghyun Ju et al., "Transparent Active Matrix Organic Light-Emitting Diode Displays Drive by Nanowire Transistor Circuitry", Nano letters, V.8, 997-1004, 2008; and Wenfeng Zhang et al., "Single Zinc-Doped Indium Oxide Nanowire as Driving Transistor for Organic Light-Emitting Diode", Applied Physics Letters 92, 153312, 2008.

In other augmented embodiments, transparent displays (i.e. displays which have some degree of transparency, i.e. that are not fully opaque) other than OLEDs may be used for the transparent display device 30.

In fully immersive (virtual reality) embodiments, any conventional display may be used, i.e. in such embodiments the display does not need to be transparent.

Further details of the switchable microlens array 34, as used in augmented reality embodiments, will now be described.

In "Microlenses immersed in nematic liquid crystal with electrically controllable focal length" L. G. Commander, S. E. Day, C. H. Chia, and D. R. Selviah, in Third European Optical Society 'Microlens Arrays' Topical Meeting, 1995, it is taught how to generate switchable microlens arrays by immersing a microlens array in a nematic liquid crystal. Such an approach has an advantage of being well established and having a large range of focal powers, it has the disadvantage of requiring polarised light application, but may be used where the optical shutter is a liquid crystal based shutter of a type also requiring polarised light.

Alternatively, suitable polarisation independent microlens arrays based on the use of liquid crystals are disclosed in U.S. Pat. No. 7,408,601 and US 2007/0183020.

Figure 6A:
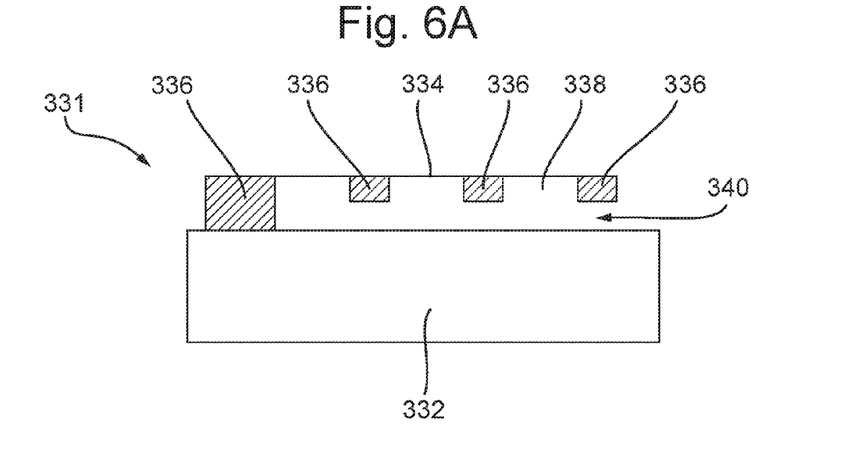
FIG. 6A is a schematic illustration (not to scale) of a fluid-filled switchable microlens array in an off-state.
Figure 6B:
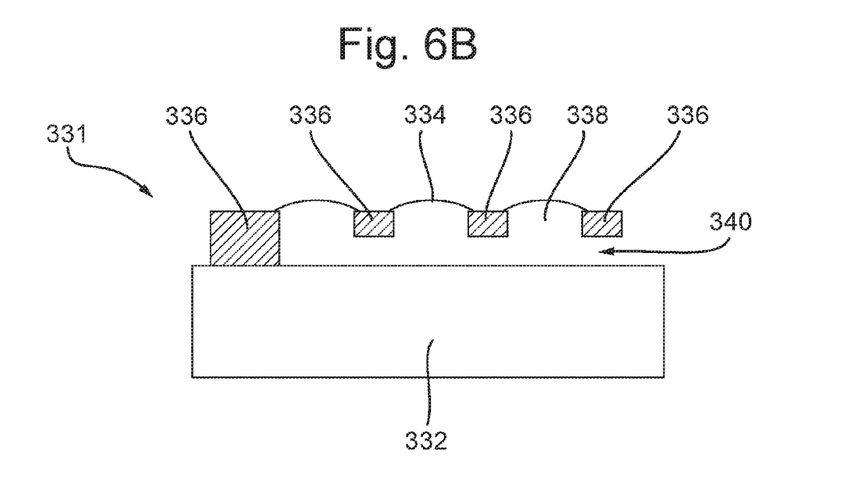
FIG. 6B is a schematic illustration (not to scale) of the fluid-filled switchable microlens array of FIG. 6A in an on-state.

Another approach for providing the switchable microlens array is to use a fluidic or fluid-filled microlens array. FIG. 6A is a schematic illustration (not to scale) of such a fluid-filled switchable microlens array 331 in an off-state. The fluid-filled switchable microlens array 331 comprises a substrate 332, and a thin membrane 334 stretched onto a frame 336 to provide a cavity that is filled with fluid to provide a fluid-filled cavity 338. In the off-state no pressure is applied (e.g. at a nominal pressure applying point indicated by reference numeral 340 in FIG. 6A). FIG. 6B is a schematic illustration (not to scale) of the same fluid-filled switchable microlens array 331 in an on-state. In the on-state pressure is applied (e.g. at the nominal pressure applying point indicated by reference numeral 340 in FIGS. 6A and 6B), resulting in the membrane 334 bowing to form the microlens array. Fluid-filled microlens arrays advantageously are able to provide very low focal lengths as described for example in the following reference, which is incorporated herein by reference: Nikolas Chronis et al., "Tunable liquid filled micro-lens array integrated with microfluidic network", Optics Express Vol. 11, Issue 19, pp. 2370-2378 (2003).

Figure 7:
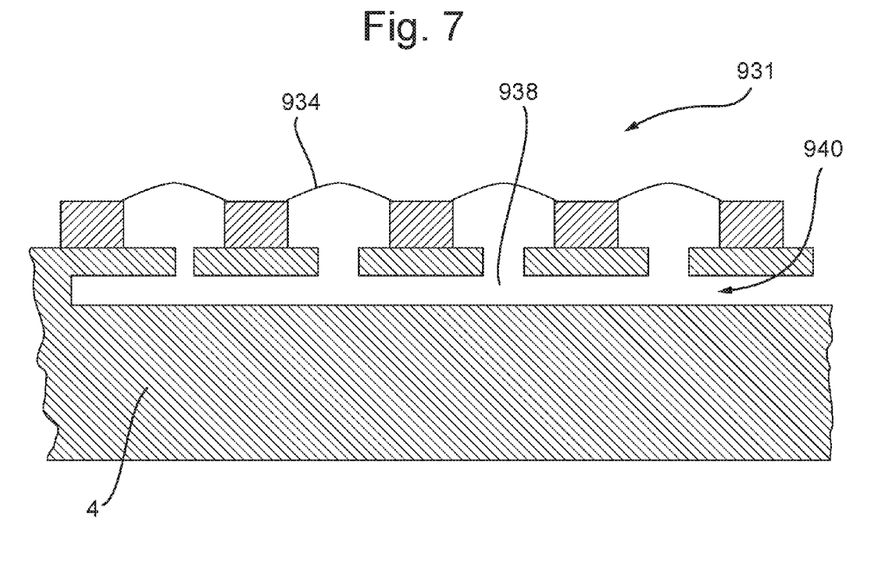
FIG. 7 is a schematic illustration (not to scale) of a fluidic microlens formed on a visor acting as substrate.

In a further embodiment, the switchable microlens array is provided in the form of a fluidic microlens array in which the visor 4 acts as the substrate of the microlens array. FIG. 7 is a schematic illustration (not to scale) of the fluidic microlens array 931 of this embodiment. The fluidic microlens array 931 is formed on the visor 4 acting as substrate. Pressure 940 is applied to a fluid filled cavity or channel 938 to make the membrane 934 bow to provide the microlenses 934 of the microlens array in the on-state. Advantageously, this allows a relatively thick fluid-filled cavity to be employed which alleviates non-uniformities in pressure, as the visor thickness can provide a sufficiently strong support without adding a further relatively thick layer of material to serve as just a substrate for the microlens array.

Another approach for providing the switchable microlens array is to use a switchable Bragg grating microlens array, i.e. one based on using Bragg grating hologram technology to generate a diffractive microlens array. as available for example from "SBG Labs" (formerly known as "Digilens"), of 1288 Hammerwood Avenue, Sunnyvale, Calif., 94089 USA.

In the above embodiments the microlens array comprises individual microlenses arrayed in rows and columns. However, in other embodiments, arrays of lenticular microlenses or hexagonal arrays of microlenses may be used.

In the above embodiments, the pitch of the lenses of the microlens is 190 μm and the spacing between the pixels and the lenses is approximately 3 mm, giving approximately 4 milliradians (mR) angular resolution at the eye (with 50 mm between the microlens array and the eye). Generally, it is preferred for the dimensions to be such that the pitch of the microlenses is approximately ¹⁄₁₅ of the spacing between the pixels and the microlenses.

In fully immersive (virtual reality) embodiments, any conventional microlens array may be used, i.e. in such embodiments the microlens array does not need to be switchable.

In the above described embodiments the described pupil tracking processing is carried out at the controller 12. However, this need not be the case. For example, in other embodiments, the pupil tracking processing may be carried out at the pupil tracker 8 itself, or such processing may be shared between the controller 12 and the pupil tracker 8. In other embodiments, other forms of eye tracking, and/or head tracking, may be implemented in addition to or instead of pupil tracking as such.

In the above described embodiments, the microlens array and the display device are separated by a distance of approximately 3 mm, and furthermore this spacing is provided by virtue of being the thickness of the visor 4. However, in other embodiments, other spacings may be employed, and/or the spacing may be achieved by mounting or spacing means other than simply using the thickness of the visor, which may therefore be of a different thickness to the spacing between the microlens array and the display device.

In the above described embodiments, various different visor shapes, and hence the various components of the display assembly, have been employed. However, no specific shape is essential. For example, in a simpler embodiment, the display assembly may be provided as a flat entity, with any visor curve being present only in areas of the visor that do not contain the display assembly. Also, for example, in embodiments with more complicated shapes than the above described embodiments, the display assembly may be provided in 3-D curved shapes matching visor shape requirements.

In the above described embodiments, the display assembly is provided in an avionic helmet, more particularly integrated as part of the visor of such a helmet. However, this need not be the case. For example, the display assembly (and any intermediate lens) may be provided for types of helmets other than avionic helmets. The display assembly (and any intermediate lens) may furthermore be provided for types of headwear other than helmets. For example, the display assembly (and any intermediate lens) may be provided as an item for equivalent use to that of welding goggles. The latter possibility represents an example of where the transparent display assembly (and any intermediate lens) may be employed usefully with relatively low transparency in the off-mode of the transparent display assembly.

Furthermore, the display assembly (and any intermediate lens and any pupil tracking) may be provided in arrangements other than headwear. For example, the display assembly may be provided integrated in part of the area of a vehicle window or windscreen. In such examples the position of the user's head may be tracked instead of that of the user's pupil. By virtue of the display being further away from the user's eye than is the case with a helmet display, resolution may be improved, e.g. by allowing improved matching to the angular resolution of the eye. Here the ability to steer the image based on information on the user's position may be used in operating the display in an auto stereoscopic mode, and/or may be used in projecting a different image to different users.

As mentioned previously, the provision of "augmented reality" is not essential, and accordingly in some embodiments only a virtual reality display assembly ("fully immersive") is provided, i.e. there is no "off mode" in the sense described for some embodiments above. In such fully immersive/virtual reality embodiments, the display device does not need to be transparent, the light blocking device does not need to be included, and the microlens arrays does not need to be switchable.

In any of the above embodiments, the above described display assemblies may be used in conjunction with further display arrangements, e.g. within a single helmet.

The invention claimed is:

1. A display assembly, comprising:
a display device having a plurality of pixels or sub-pixels;
a microlens array; and
an eye or pupil tracker and/or a head tracker;
wherein one or more of the plurality of pixels or sub-pixels of the display device are associated with each microlens of the microlens array, and
wherein the assembly is adapted such that, for each microlens, only one respective pixel or sub-pixel of the display device is activated or selected for any particular determined pupil or eye or head position.

2. A display assembly according to claim 1, wherein the eye tracker comprises a pupil tracker.

3. A display assembly according to claim 1, wherein the display assembly has a spherical shape.

4. A display assembly according to claim 1, wherein the display device is a transparent display device, and the microlens array is a switchable microlens array.

5. A display assembly according to claim 4, further comprising a light blocking device that is switchable between a substantially light blocking state and a substantially light passing state.

6. A display assembly according to claim 5 wherein the transparent display device is positioned between the light blocking device and the switchable microlens array.

7. A display assembly according to claim 4 wherein the transparent display device comprises an organic light emitting diodes display.

8. A visor for a helmet, the visor comprising a display assembly comprising: a display device having a plurality of pixels or sub-pixels; a microlens array; and an eye or pupil tracker and/or a head tracker;
wherein one or more of the plurality of pixels or sub-pixels of the display device are associated with each microlens of the microlens array, and
wherein the assembly is adapted such that, for each microlens, only one respective pixel or sub-pixel of the display device is activated or selected for any particular determined pupil or eye or head position.

9. A visor according to claim 8, further comprising a light blocking device that is switchable between a substantially light blocking state and a substantially light passing state wherein the display device is a transparent display device, and wherein the light blocking device and the transparent device are positioned one side of the visor, and the microlens array is positioned on the other side of the main body of the visor.

10. A visor according to claim 9 wherein the microlens array is a switchable microlens array, and wherein the transparent display device and the switchable microlens array are separated by a spacing that is provided by virtue of being the thickness, substantially, of the main body of the visor.

11. A visor according to claim 8, wherein the microlens array is a switchable microlens array, and wherein the switchable microlens array comprises a fluidic microlens array or a fluidic-filled microlens array, and wherein the visor acts as a substrate of the fluid/fluidic-filled microlens array.

12. A method of operating a display assembly; the method comprising providing a display assembly comprising a display device having a plurality of pixels or sub-pixels, a microlens array and an eye or pupil tracker and/or a head tracker, wherein one or more of the plurality of pixels or sub-pixels of the display device are associated with each microlens of the microlens array, tracking and determining a pupil or eye or head position, and, for each microlens, activating or selecting only one respective pixel or sub-pixel of the display device for any particular determined pupil or eye or head position.

13. A method of operating a display assembly according to claim 12, wherein the method comprises providing a light blocking device and a switchable microlens array, the method comprising:
operating the display assembly in a time-multiplexed manner between an off mode and an on mode; wherein
in the off mode external images are allowed to be viewed through the display assembly by virtue of at least some transparency of the display device, by virtue of switching the light blocking device to a substantially light passing state, and by virtue of switching the switchable microlens array to a substantially optically flat mode;

in the on mode external images are substantially blocked by virtue of switching the light blocking device to a substantially light blocking state; and further, in the on mode, display images are provided by virtue of switching the display device to an image-providing mode, and by virtue of switching the switchable microlens array to an optically active light directing mode.

14. A method according to claim 12, wherein the eye tracker comprises a pupil tracker.

* * * * *